United States Patent
Klein et al.

(10) Patent No.: US 10,040,019 B2
(45) Date of Patent: Aug. 7, 2018

(54) PLEATED FILTER ELEMENT

(71) Applicant: MANN+HUMMEL GMBH, Ludwigsburg (DE)

(72) Inventors: Martin Klein, Ludwigsburg (DE); Frank Bartel, Dingolfing (DE); Jobst Eisengraeber-Pabst, Oberstenfeld (DE); Anton Kreiner, Reisbach (DE); Pamela Gohl, Remseck (DE); Lars Spelter, Ditzingen (DE); Armando Labarta, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/352,087

(22) Filed: Nov. 15, 2016

(65) Prior Publication Data

US 2017/0056807 A1    Mar. 2, 2017

Related U.S. Application Data

(63) Continuation of application No. PCT/EP2015/061252, filed on May 21, 2015.

(30) Foreign Application Priority Data

May 21, 2014  (DE) .......................... 10 2014 007 373

(51) Int. Cl.
    *B01D 46/00*    (2006.01)
    *B01D 46/52*    (2006.01)
    (Continued)

(52) U.S. Cl.
    CPC .......... *B01D 46/522* (2013.01); *B01D 29/21* (2013.01); *B01D 29/52* (2013.01); *B01D 46/002* (2013.01);
    (Continued)

(58) Field of Classification Search
    CPC ...... B01D 46/02; B01D 46/522; B01D 29/21; B01D 29/52; B01D 2201/122;
    (Continued)

(56) References Cited

U.S. PATENT DOCUMENTS 4,154,688 A * 5/1979 Pall ........................ B01D 29/21
                                                          210/487
4,640,779 A   2/1987 Taki et al.
                     (Continued)

*Primary Examiner* — Heidi R Kelley
*Assistant Examiner* — Karla Hawkins
(74) *Attorney, Agent, or Firm* — James Hasselbeck

(57) ABSTRACT

A filter element is provided with a folded bellows that has a first pleated section with parallel arranged first pleats and a second pleated section with parallel arranged second pleats. The first pleats of the first pleated section are positioned at an angle relative to the second pleats of the second pleated section. The end face edges of the first pleats of the first pleated section adjoin a first clean chamber. The end face edges of the second pleats of the second pleated section adjoin a second clean chamber. The second clean chamber is delimited by a longitudinal side of an edge-side pleat of the first pleated section. The first and second clean chambers are connected to each other. A filter insert with such a filter element is provided.

14 Claims, 5 Drawing Sheets

(51) Int. Cl.
*B01D 29/21* (2006.01)
*B01D 29/52* (2006.01)
*B01D 46/24* (2006.01)

(52) U.S. Cl.
CPC .. *B01D 46/2411* (2013.01); *B01D 2201/0415* (2013.01); *B01D 2201/0423* (2013.01); *B01D 2201/122* (2013.01); *B01D 2201/291* (2013.01); *B01D 2201/298* (2013.01); *B01D 2267/40* (2013.01); *B01D 2275/206* (2013.01)

(58) Field of Classification Search
CPC ........ B01D 2201/291; B01D 2201/298; B01D 2201/423
See application file for complete search history.

(56) References Cited

U.S. PATENT DOCUMENTS

| | | | | |
|---|---|---|---|---|
| 4,673,503 A | * | 6/1987 | Fujimoto | B01D 29/21 210/493.1 |
| 6,312,489 B1 | | 11/2001 | Ernst et al. | |
| 2003/0168390 A1 | * | 9/2003 | Jainek | B01D 29/21 210/97 |
| 2006/0065592 A1 | * | 3/2006 | Terres | B01D 46/125 210/493.1 |

\* cited by examiner

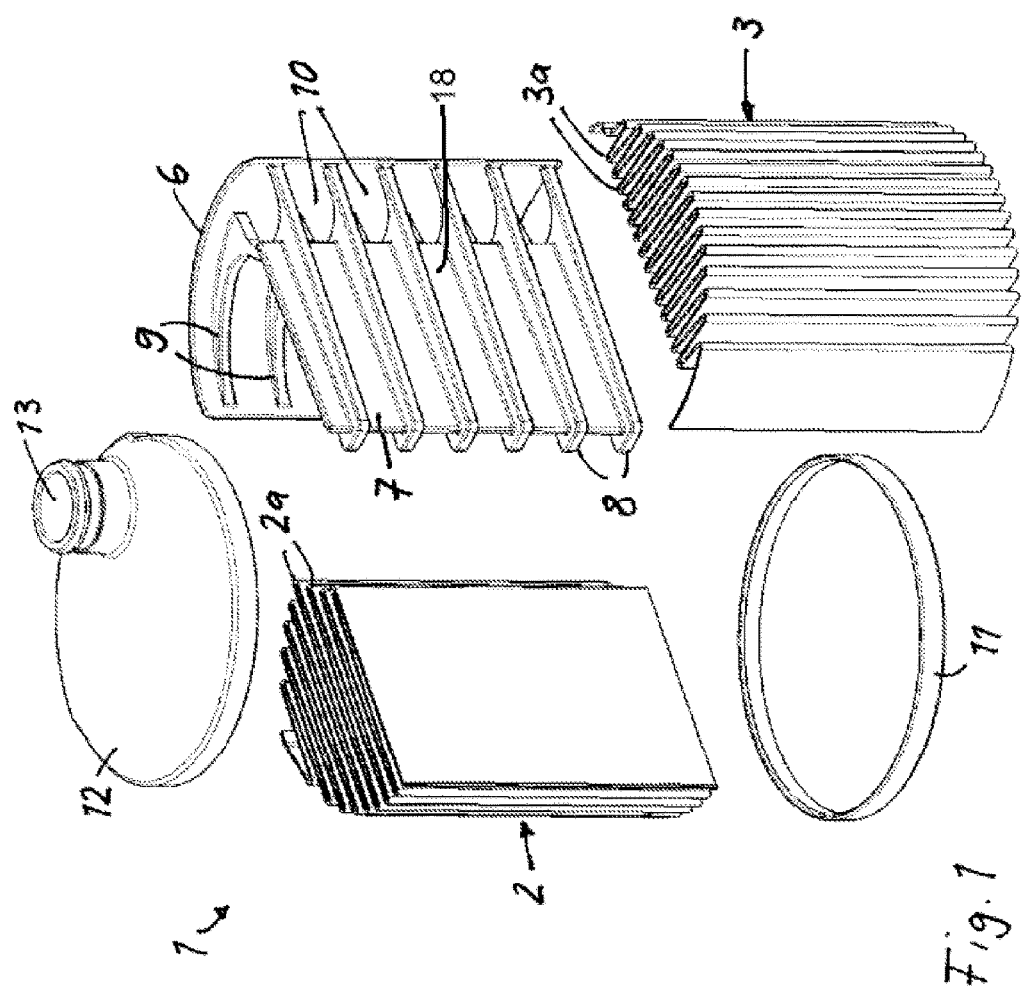

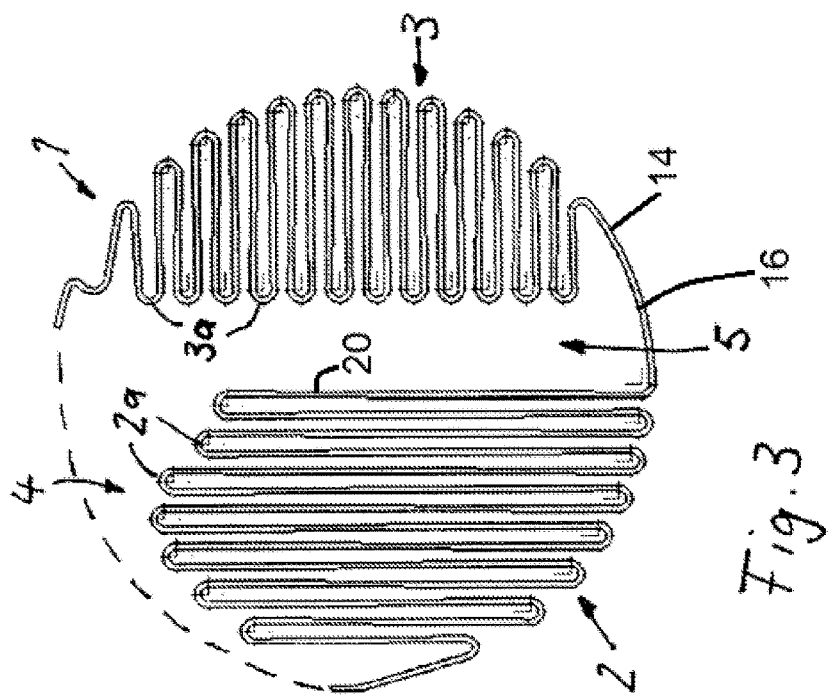
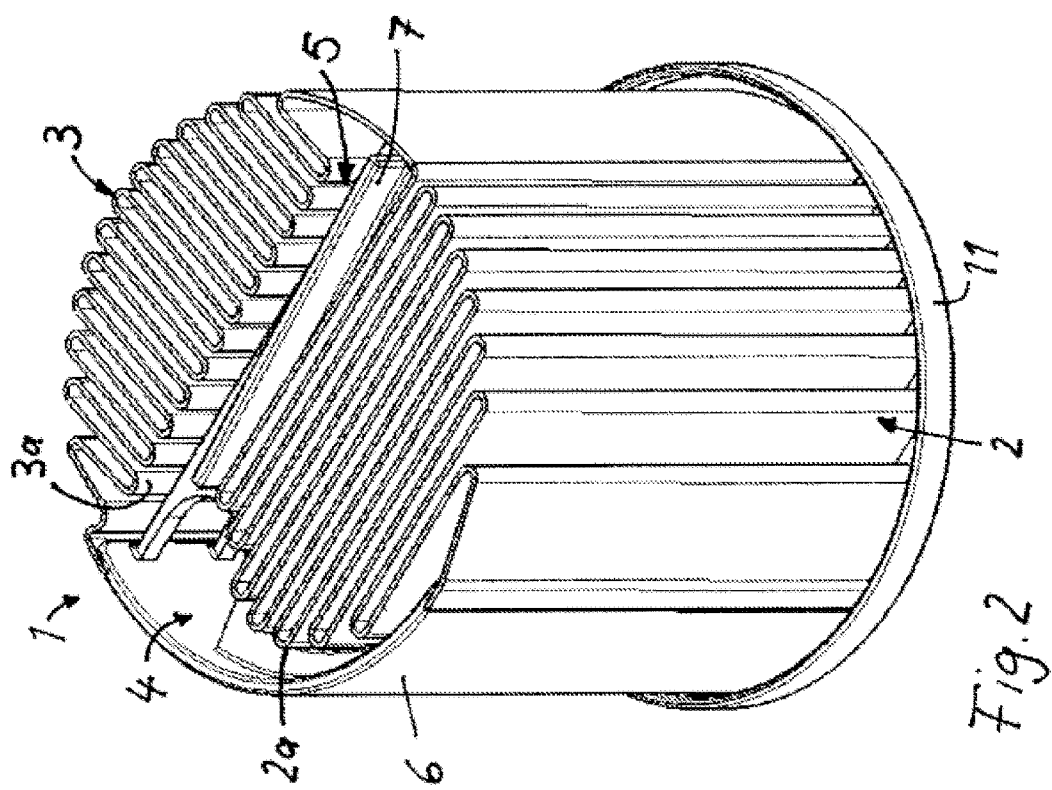

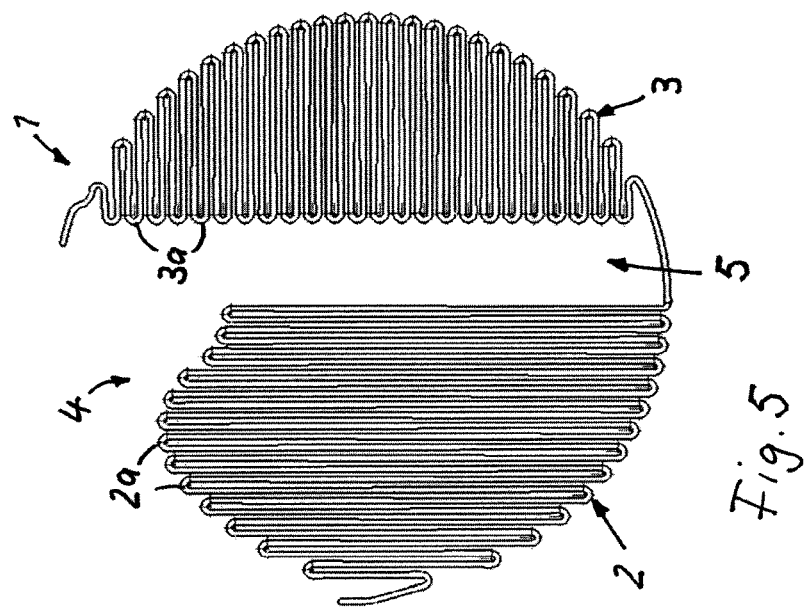
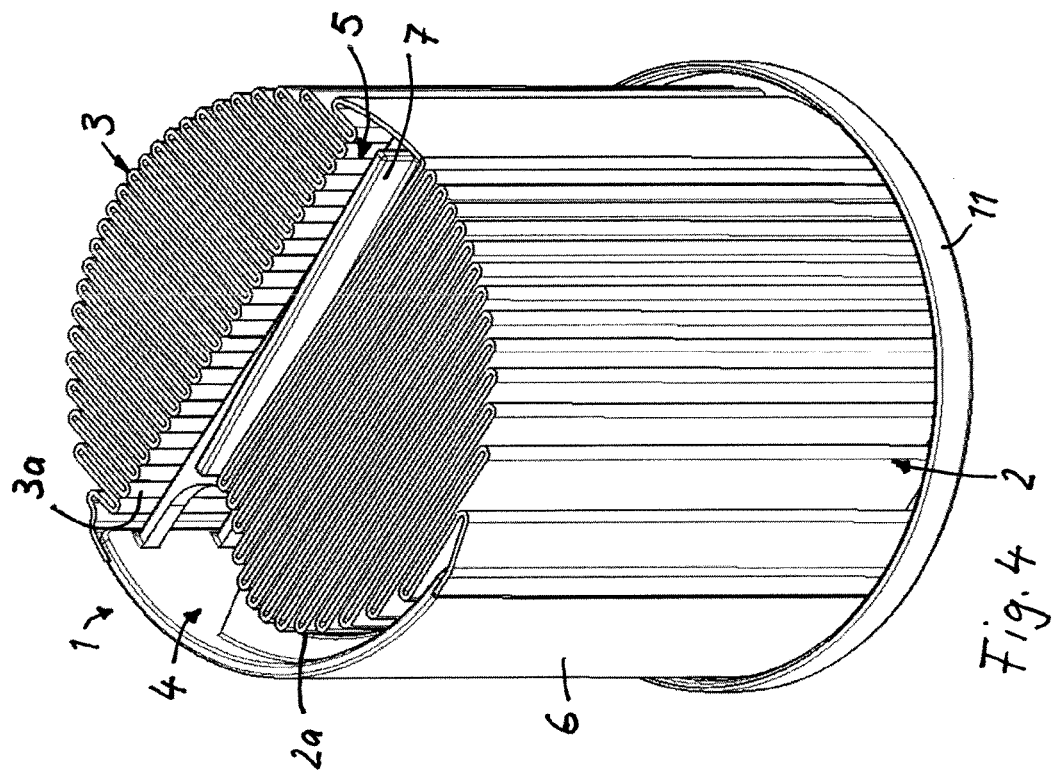

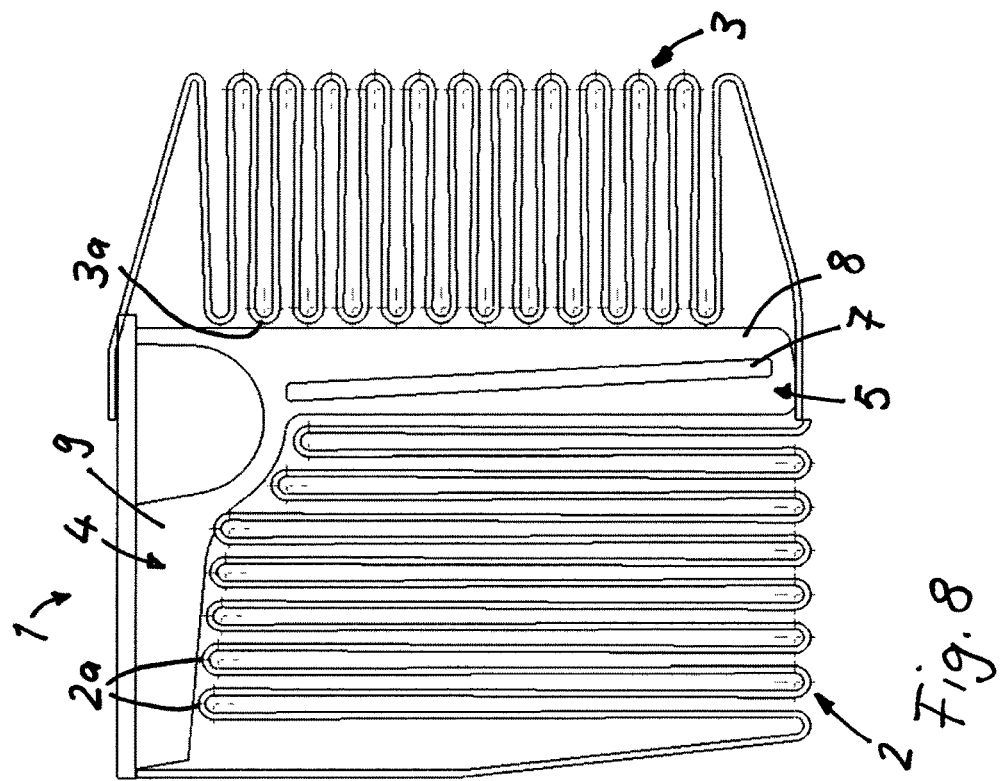
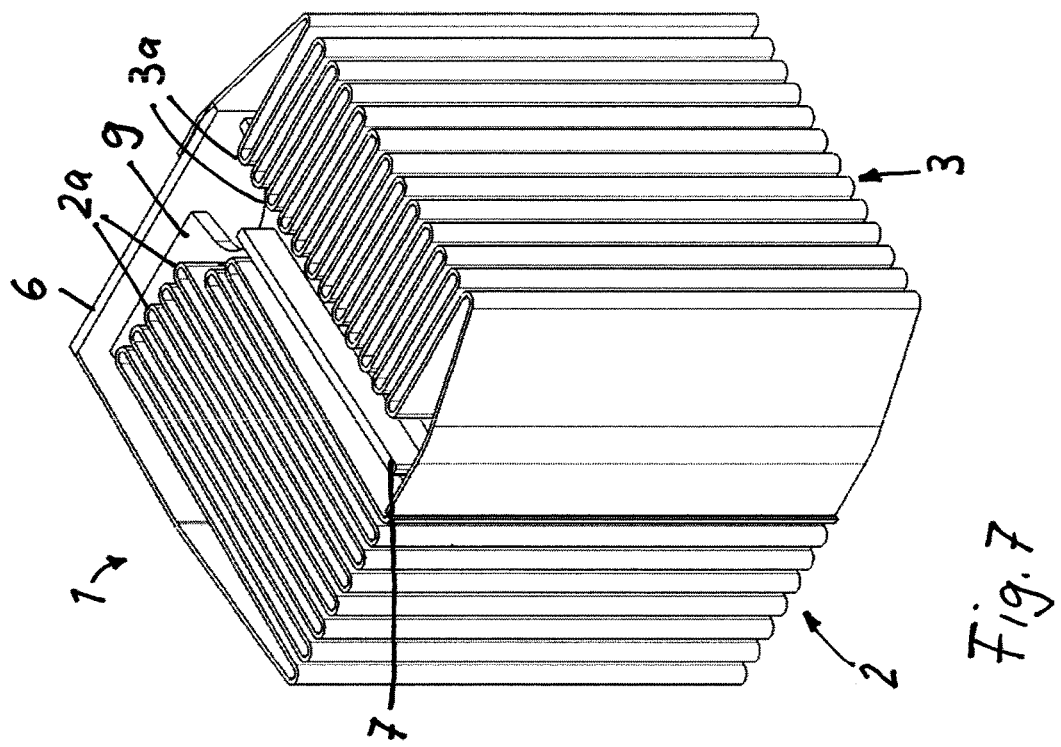

PLEATED FILTER ELEMENT

CROSS-REFERENCE TO RELATED APPLICATIONS

This application is a continuation application of international application No. PCT/EP2015/061252 having an international filing date of 21 May 2015 and designating the United States, the international application claiming a priority date of 21 May 2014, based on prior filed German patent application No. 10 2014 007 373.4, the entire contents of the aforesaid international application and the aforesaid German patent application being incorporated herein by reference.

BACKGROUND OF THE INVENTION

The invention concerns a folded filter element with folded bellows, comprising a first pleated section with parallel arranged pleats and a second pleated section with parallel arranged pleats, wherein the pleats of the first and of the second pleated sections are positioned at an angle relative to each other.

U.S. Pat. No. 5,043,000 A discloses an air filter element that is cylindrically configured and is comprised of several filter segments distributed about the circumference, wherein each filter segment extends across a defined circumferential angle and is designed as a pleated filter. In the interior of the filter element an axially extending hollow space is formed that forms the common clean chamber for all filter sectors. The pleats of filter sectors that are adjoining each other extend in different directions wherein the filter sectors, relative to a center plane through the filter element, are arranged mirror-symmetrical.

SUMMARY OF THE INVENTION

It is the object of the invention to configure an efficiently operating pleated filter element by means of simple constructive measures.

This object is solved according to the invention in that the end face edges of the pleats of each pleated section adjoin a clean chamber, respectively, wherein the clean chamber of a first pleated section is delimited by the longitudinal side of an edge-side pleat of the second pleated section and the clean chambers of the pleated sections are connected to each other.

The dependent claims provide expedient further embodiments.

The filter element according to the invention which is pleated or designed as a pleated bellows can be used as a liquid filter, for example, as a fuel filter or, if need be, also as an oil filter. However, filtration of gaseous fluids is also conceivable, for example, use as an air filter.

The filter element comprises at least two pleated sections wherein, within each pleated section, pleats extend parallel or at least approximately parallel to each other. The pleated sections are positioned at an angle relative to each other so that the pleats of the first and of the second pleated sections do not extend parallel to each other and have an angle greater than 0° and smaller than 180° relative to each other.

The flow through each pleated section is realized in the direction of the pleats, i.e., substantially transverse to a longitudinal direction along which the fold edges are aligned. Due to the angled arrangement relative to each other of the two pleated sections, the pleated sections are flowed through in different directions. The end faces or end face edges of the pleats border a clean chamber, respectively, on the clean side. Each pleated section has correlated therewith a clean chamber which extends along the end face or end face edges on the clean side of the pleated section. The clean chambers of the pleated sections are connected to each other and form a common clean chamber for receiving the purified fluid. Since the individual clean chambers are communicating fluidically with each other, one outflow opening is sufficient for discharging the purified fluid from all clean chambers.

As a result of the angled arrangement of the pleats of the pleated sections relative to each other, at least one clean chamber of a first pleated section is delimited by a longitudinal side of an edge-side pleat of the second pleated section. The angled arrangement of the pleated sections relative to each other causes also an angled relative position of the individual clean chambers relative to each other.

The clean chambers have a cross-sectional geometry which is dependent on the course of the end faces or end face edges of a pleated section on the clean side. Inasmuch as the end faces of the pleats of a pleated section are positioned on a common straight line or plane surface, the correlated clean chamber is advantageously at least approximately flat at the end face of the pleats and, if need be, on the opposite side can be delimited by the side surface of the flat edge pleat of the neighboring pleated section. Depending on the relative angular position of the pleated sections relative to each other, this provides a clean chamber with angled geometry like a triangle or trapezoid or, at a 90° angle arrangement of the pleated sections relative to each other, a rectangular cross-sectional geometry.

Inasmuch as the end faces of a pleated section are not positioned on a common line but follow a curved course, the corresponding clean chamber at this side has a corresponding curved course. Moreover, a clean chamber can be delimited toward the exterior by a flow-guiding part which is connected in a suitable way with one or with both pleated sections, for example, glued or fused thereto. In combination with the curved course on the end face edges of the pleats of the corresponding pleated section at the clean side, a bean-shaped or kidney-shaped cross-section results for the clean chamber, for example.

In principle, different combinations with respect to the cross-sectional geometry of the clean chamber can be considered which depends on the course of the end faces of the pleats of the respective corresponding pleated section, on the one hand, and the oppositely positioned wall of at least one clean chamber, on the other hand. Inasmuch as a wall of the clean chamber is formed by an adjoining edge pleat of the neighboring pleated section, this wall side is configured flat. When, on the other hand, the wall which is opposite the end faces is formed by a surrounding filter center section or a flow-guiding part, the cross-sectional geometry of the wall of the clean chamber at this side follows the corresponding geometry of the edge-side section on the filter element, i.e., the flow-guiding part or the filter means.

The pleated filter element comprises at least two pleated sections whose pleats are positioned at an angle relative to each other. However, filter elements with more than two pleated sections, for example, three or four pleated sections, are conceivable also wherein at least the pleats of immediately adjoining pleated sections are positioned angularly relative to each other and the clean chambers of all pleated sections are connected with each other. In any case, it is advantageous that relative to a longitudinal center axis or a longitudinal center plane the filter element is not embodied symmetrical relative to a point or mirror-symmetrical.

The pleated filter element according to the invention is characterized by a high pleat density and good utilization of the available mounting space so that high filtration efficiencies can be realized.

The different pleated sections can be embodied separate from each other wherein, in this case, the adjoining pleated sections are connected to each other, for example, by gluing. However, a one-part configuration of the filter element that is divided by an appropriate folding action into the first and the second pleated sections with parallel pleats per pleated section is conceivable also. The filter medium of the filter element is comprised preferably of paper or nonwoven.

According to a further advantageous embodiment, it is provided that at least one clean chamber is embodied to be open at the rim side. In the configuration open at the rim side, the clean chamber is not delimited in outward direction by the filter element but by a flow-guiding housing section which extends at least across a portion of the circumference of the filter element. This embodiment has the advantage that the filter sections, for example, as described above, can be produced as one part from a common filter means or filter medium wherein the two edge-side pleats of the pleated sections are not connected to each other but are ending so as to be open. The connection is then realized by the flow-guiding part that is connected with both edge-side pleats.

The flow-guiding part can be connected with at least one end disk which is resting on an end face of the pleated sections. Preferably, the filter element has at both its axial end faces an end disk, respectively.

As an alternative to a configuration open at the rim side of at least one clean chamber, also a circumferentially closed embodiment of all clean chambers is possible which is, for example, achieved when the edge pleats of the pleated sections that are facing away from each other are connected to each other, for example by gluing.

According to yet another advantageous embodiment, a support structure is inserted in at least one clean chamber. Advantageously, the support structure extends into all clean chambers and ensures stabilization of the pleats of each pleated section. The support structure has, for example, support ribs which extend transversely within the clean chamber and hold the pleats of neighboring pleated sections at a spacing to each other.

Inasmuch as at least one clean chamber is open at the rim side and the open side is closed by a flow-guiding part, the housing shell and the support structure projecting into the clean chamber are advantageously embodied as one part. In the area of the circumference on the outer side of the filter element, the flow-guiding part can be provided with radially inwardly pointing support ribs which extend into a first clean chamber. The support structure forming one part together with the flow-guiding part is formed with additional ribs which extend into the second adjoining clean chamber. The support ribs form a support structure or are part of the support structure, respectively.

Round as well as rounded cross-sectional geometries of the filter element as well as angular cross-sectional geometries are conceivable. In case of round cross-sectional geometries, the filter element as a whole is cylindrically embodied, for example, or has an elliptical or approximately elliptical cross-section. In case of angular cross-sectional geometries, the filter element is embodied, for example, as a parallelepiped.

BRIEF DESCRIPTION OF THE DRAWINGS

Further advantages and expedient embodiments can be taken from the additional claims, the figure description, and the drawings.

FIG. 1 is an exploded illustration of the components of a pleated filter element with a first and a second pleated sections whose pleats are arranged at a right angle relative to each other, with a flow-guiding part which is formed as one part together with a support structure, as well as with a first end disk on an end face of the filter element, and a further end disk with an outflow opening at the opposite end face.

FIG. 2 shows the filter element in partially assembled state in perspective view.

FIG. 3 is a plan view of the filter element with first and second filter sections.

FIG. 4 is an illustration of a filter element corresponding to FIG. 2 but with more densely packed pleats in each pleated section.

FIG. 5 is a plan view of the filter element according to FIG. 4.

FIG. 7 shows in perspective view the filter element of FIG. 6 in mounted state.

FIG. 8 is a plan view of the filter element according to FIGS. 6 and 7.

In the Figures, same components are provided with same reference characters.

PREFERRED EMBODIMENTS OF THE INVENTION

Figure 6:
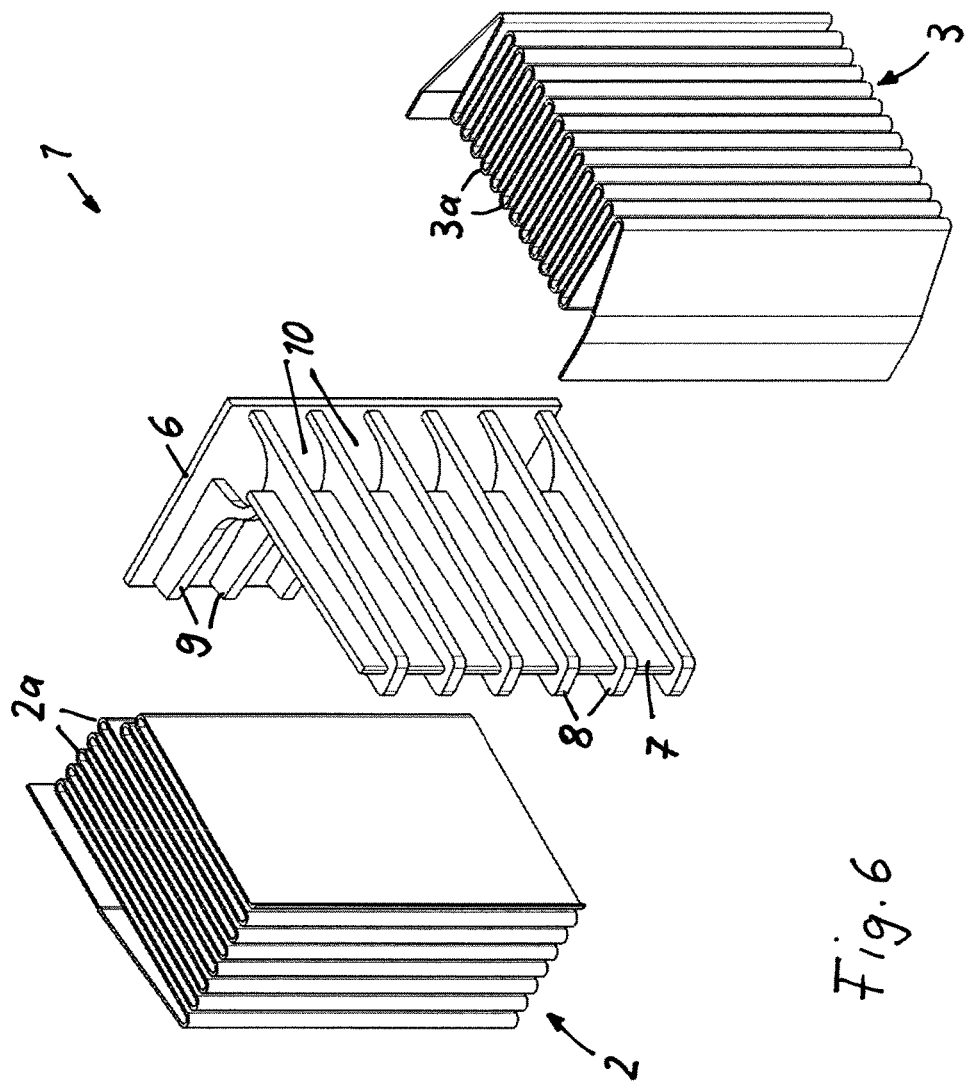
FIG. 6 shows in exploded illustration the components of a pleated filter element with rectangular cross-sectional geometry.

In FIGS. 1 to 3, a first embodiment of a filter element 1 with a pleated filter means or filter medium is illustrated which, for example, is comprised of folded paper, a foam or nonwoven. The filter element 1 is a component of a filter insert which can be inserted into a receiving filter housing of a filter device. The filter element 1 is preferably employed in a liquid filter, in particular in a fuel filter.

The filter element 1 comprises two pleated sections 2 and 3 wherein each pleated section 2, 3 comprises a plurality of individual pleats that are parallel to each other. In the finish-mounted state (FIG. 2) the filter element 1 has a cylindrical shape. The filter medium of the filter element 1 is flowed through radially from the exterior to the interior by the fluid to be purified so that the radially outwardly positioned wall surface forms the raw side. The pleated sections 2 and 3 are oriented relative to each other such that the pleats of each pleated section 2, 3 are positioned at an angle of 90° relative to each other. The clean side of each pleated section 2, 3 is located at the end faces or end face edges 2a, 3a of the pleats which are positioned opposite the radially outwardly positioned circumferential side of each pleated section. Accordingly, the clean-side end face edges or end faces 2a, 3a delimit a clean chamber 4, 5 (FIGS. 2, 3), respectively, in which the purified fluid will collect after having flowed through the pleated sections 2, 3. The pleats of each pleated section 2, 3 are approximately radially oriented so that the end face edges of the pleats that are positioned opposite the clean-side end face edges 2a, 3a form the raw side or inflow side positioned at the circumferential side of the filter element.

The length of the pleats in each pleated section is smaller than the diameter of the filter element. In this way, it is ensured that the first clean chamber 4 which is correlated with the first pleated section 2 is still located within an envelope that follows the round base cross-section about the filter element 1. Relative to the rim side, there is no boundary of the filter means or filter medium at the clean chamber 4.

The second clean chamber 5 which is correlated with the second pleated section 3 extends transversely through the filter element, wherein the clean chambers 4 and 5 pass into each other. The pleats of the second pleated sections 3 have a length that is smaller than half the diameter of the filter element. At the same time, the extension of the first pleated section 2 transverse to its longitudinal extension of the pleats is approximately half as large as the diameter wherein the edge-side pleat of the pleated section 2 delimits the clean chamber 5 of the second pleated section 3. The end faces or end face edges 3a of the second pleated section 3 are positioned in a common plane so that the clean chamber 5 comprises a corresponding flat boundary side relative to the second pleated section 3. As a result of the 90° orientation of the two pleated sections 2 and 3 relative to each other and of the edge pleat of the pleated section 2 positioned opposite the end faces 3a, which delimit the clean chamber 5 at this side, the clean chamber 5 has an approximately rectangular cross-section. An end of the clean chamber (4,5) may be delimited by the longitudinal side 16 of an edge-side pleat 14 of the second pleated section 3 and the clean chambers (4,5) of the pleated sections are connected to each other.

In contrast, the end faces or end face edges of the first pleated section 2 at the clean side are not positioned in a common plane; instead, the end faces 2a form a curved line so that the clean chamber 4, within the envelope about the filter element 1, has a changing cross-section which is increasing in circumferential direction toward the second clean chamber 5. The end faces 2a of the pleats of the first pleated section 2 extend along a convex line so that the respective edge-side pleats in the area of their end face 2a are extending not as far toward the outer circumference as the central pleats.

As can be seen in FIGS. 2 and 3, the two pleated sections 2 and 3 are advantageously formed together as one part from a common filter means or filter medium. However, a separate configuration is possible also wherein the pleated sections 2, 3 are preferably connected with each other, for example, are glued together in the area of their rim-side pleats adjoining each other, so that the clean chamber 5 on the side which is facing away from the other clean chamber 4 is closed at the rim side.

The two clean chambers 4 and 5 pass into each other and form a common clean chamber which is approximately hook-shaped. The clean chamber 4 is open at the rim side wherein, as indicated in FIG. 3 by a dashed line, also a closed rim side configuration is conceivable, if need be. In this case, the open ends of the filter medium or filter means of each pleated section 2, 3 are connected to each other.

In the illustrated embodiment according to FIGS. 1 to 3, the open section at the rim side in the area of the clean chamber 4 is delimited by a flow-guiding part 6 which extends across an angle segment of approximately 90° and connects the open ends of the pleats at each pleated section 2, 3 with each other. The open ends of the pleats are, for example, glued or fused to the flow-guiding part 6. The flow-guiding part 6 delimits the first clean chamber of the first pleated section 2 and separates it from the environment. The flow-guiding part 6 is of a part-circular shape and supplements the filter element 1 to an overall circular completed cross-section. The flow-guiding part 6 is advantageously designed as a plastic component.

A support structure 7 is formed as one part together with the flow-guiding part 6 and is arranged at an angle to the flow-guiding part 6 and is projecting into the second clean chamber 5 which is correlated with the second pleated section 3. The support structure 7 has a straight extension. On the support structure 7 support ribs 8 are formed (FIG. 1) that may extend across the width of the clean chamber 5 and in the area of one side adjoin the end faces or end face edges 3a of the second pleated section 3 and on the opposite side adjoin the side surface of the edge-side pleat of the first pleated section 2. In this way, the clean chamber 5 is kept open and an expansion of the pleats of the pleated sections 2 or 3 into the clean chamber 5 is prevented. The support structure 7 with the support ribs 8 ensure thus a stabilization of both pleated sections 2, 3.

On the inner side of the flow-guiding part 6, support ribs 9 are also formed which project into the first clean chamber 4 correlated with the first pleated section 2. The support ribs 9 follow advantageously the cross-section of the first clean chamber 4 so that the end faces or end face edges 2a of the pleats of the first pleated section 2 contact and support the support ribs 9.

Distributed across the axial height of the filter element 1, several support ribs 8 and 9 are formed on the support structure 7 or the flow-guiding part 6. The support structure 7 can comprise a central wall 18 extending in axial direction, wherein at both sides the support ribs 8 are extending. At the transition of the wall 18 of the support structure 7 into the flow-guiding part 6, through openings 10 are introduced by means of which a flow communication between the clean chambers 4 and 5 is ensured.

At one axial end face of the filter element 1, a first end disk 11 is arranged and a second end disk 12 is located on the opposite axial end face of the filter element. In the second end disk 12 a socket with an outflow opening 13 is introduced which is at the level of the common clean chamber formed by the two clean chambers 4 and 5. By means of the outflow opening 13, the purified fluid can be discharged from the common clean chamber.

In the first embodiment according to FIGS. 1 to 3, the pleats are oriented parallel to each other in each pleated section 2 and 3 and are positioned at a spacing to each other so that between adjacent pleats an intermediate space is formed. In the second embodiment according to FIGS. 4 and 5, on the other hand, a denser packing of pleats in the pleated sections 2 and 3 is shown. According to FIGS. 4 and 5, neighboring pleats of the pleated sections 2 and 3 are in immediate contact with each other.

In FIGS. 6 to 8 a further embodiment is illustrated. In contrast to the first embodiment, the filter element 1 in FIGS. 6 to 8 has as a whole a parallelepipedal overall cross-section. Also, the two pleated sections 2 and 3 of the filter element 1 are each of a parallelepipedal shape.

In other respects, the basic configuration is designed in analogy to the first embodiments. The pleated sections 2 and 3 have each a plurality of parallel extending pleats wherein the pleats of the two pleated sections 2 and 3 are positioned at a 90° angle to each other. The two clean chambers 4 and 5 which are correlated with the pleated sections 2 and 3 and are located at the end faces or end face edges 2a, 3a of the pleated sections 2, 3 also pass into each other and form as a whole an L-shape. The clean chamber 5 which is correlated with the second pleated section 3 has a rectangular cross-ssection and is delimited at one side by the end faces or end face edges 3a of the pleats of the pleated sections 3 that are arranged in a straight line and at the opposite side by the edge-side pleat of the first pleated section 2. The end faces or end face edges 2a of the first pleated section 2 are not positioned on a common straight line but instead the pleats have different lengths so that a stepped course along the end faces 2a results.

The first clean chamber 4 which is correlated with the first pleated section 2 is embodied open at the rim side; into the open side a flow-guiding part 6 is inserted. The open ends of the two pleated sections 2 and 3 are connected with the flow-guiding part 6. In the area of the opposite ends, they can be connected to each other in order to close off in outward direction the clean chamber 5 at the side which is facing away from the clean chamber 4.

The support structure 7 is formed as one part together with the flow-guiding part 6 and extends into the clean chamber 5 and is embodied at a 90° angle relative to the flow-guiding part 6. The support structure 7 comprises a central wall on which support ribs 8 are integrally formed which are laterally adjoined by the end face edges 3a of the pleats of the second pleated section 3 and the edge-side pleat of the first pleated section 2. On the inner side of the flow-guiding part 6, several support ribs 9 are integrally formed which project into the first clean chamber 4. Between the support ribs 8 and 9, through openings 10 are formed through which the clean chambers 4 and 5 are fluidically communicating with each other.

While specific embodiments of the invention have been shown and described in detail to illustrate the inventive principles, it will be understood that the invention may be embodied otherwise without departing from such principles.

What is claimed is:

1. A filter element comprising:
   a folded bellows comprising a first pleated section with parallel arranged first pleats and a second pleated section with parallel arranged second pleats, wherein the first pleats of the first pleated section are positioned at an angle relative to the second pleats of the second pleated section;
   wherein end face edges of the first pleats of the first pleated section adjoin a first clean chamber;
   wherein end face edges of the second pleats of the second pleated section adjoin a second clean chamber;
   wherein a first end of the second clean chamber is delimited by a longitudinal side of an edge-side pleat at a first end of the second pleated section;
   wherein the first and second clean chambers are connected to each other;
   a support structure having:
      a central wall arranged in the clean chambers, arranged between and spacing apart the first pleated section from the second pleated section,
      wherein the central wall has a first side face that extends across and supports the end face edges of the parallel arranged second pleats of the second pleat section,
      wherein the central wall has an opposite second side face adjoining and extending along and supporting a side surface of the first edge-side pleat, the first edge-side pleat at an end of the first pleated section;
   wherein the support structure further comprises:
      a plurality of support ribs formed onto the first side face and onto the opposite second side face of the central wall;
      wherein the support ribs at the first side face of the central wall contact against and support the end face edges of the parallel arranged second pleats of the second pleat section,
      wherein the support ribs at the opposite second side face of the central wall contact against and support the side surface of the first edge-side pleat at an end of the first pleated section.

2. The filter element according to claim 1, wherein the first pleats of the first pleated section are positioned at an angle of 90 degrees relative to the second pleats of the second pleated section.

3. The filter element according to claim 1, wherein the first pleated section is embodied separate from the second pleated section.

4. The filter element according to claim 3, wherein the first and second pleated sections are glued or fused to each other.

5. The filter element according to claim 1, wherein the first and second pleated sections are formed together as one part.

6. The filter element according to claim 1, wherein the first and second clean chambers are configured to be closed at a rim side of the filter element.

7. The filter element according to claim 1, wherein the support structure extends into the first and the second clean chambers.

8. The filter element according to claim 1, wherein the filter element comprises a round cross-sectional geometry or a rectangular cross-sectional geometry.

9. The filter element according to claim 1, wherein the filter element is asymmetrically embodied relative to a longitudinal center axis of the filter element or a longitudinal center plane of the filter element.

10. A filter insert comprising a filter element according to claim 1, the filter insert comprising
   a flow-guiding part delimiting the filter element at least about a portion of a circumference of the filter element,
   wherein the a flow guiding part forms a wall which closes off the an opposite second end of the second clean chamber by extending between and connecting the first pleated section to the second pleated section.

11. The filter insert according to claim 10, wherein the flow-guiding part and the support structure are formed together as one part.

12. The filter insert according to claim 10, further comprising
   an end disk comprising an outflow opening,
   wherein the end disk is placed onto a filter medium of the filter element and
   wherein the outflow opening communicates with one of the first and second clean chambers of the filter element.

13. The filter element according to claim 1, wherein the support structure further comprises:
   a flow guiding part forming a wall which closes off the an opposite second end of the second clean chamber by extending between and connecting the first pleated section to the second pleated section.

14. The filter element according to claim 13, wherein the flow guide part has flow guide support ribs formed on an inner face of the flow guide part, the flow guide support ribs projecting into the first clean chamber, wherein the flow guide support ribs contact and support the end face edges of the parallel arranged second pleats of the first pleat section.

* * * * *